US010345882B2

(12) United States Patent
Wen et al.

(10) Patent No.: US 10,345,882 B2
(45) Date of Patent: Jul. 9, 2019

(54) DYNAMIC POWER METER WITH IMPROVED ACCURACY AND SINGLE CYCLE RESOLUTION

(71) Applicant: MEDIATEK INC., Hsinchu (TW)

(72) Inventors: Huajun Wen, Austin, TX (US); Hugh Thomas Mair, Fairview, TX (US); Hsin-Chen Chen, Tainan (TW); Brian King Flachs, Georgetown, TX (US)

(73) Assignee: MEDIATEK INC., HsinChu (TW)

( * ) Notice: Subject to any disclaimer, the term of this patent is extended or adjusted under 35 U.S.C. 154(b) by 665 days.

(21) Appl. No.: 14/933,542

(22) Filed: Nov. 5, 2015

(65) Prior Publication Data
US 2016/0291068 A1    Oct. 6, 2016

Related U.S. Application Data

(60) Provisional application No. 62/160,109, filed on May 12, 2015, provisional application No. 62/139,926, filed on Mar. 30, 2015.

(51) Int. Cl.
G06F 1/3203    (2019.01)
G06F 1/04      (2006.01)

(52) U.S. Cl.
CPC .............. *G06F 1/3203* (2013.01); *G06F 1/04* (2013.01)

(58) Field of Classification Search
CPC .................................................. G06F 1/3203
See application file for complete search history.

(56) References Cited

U.S. PATENT DOCUMENTS

2004/0107058 A1* 6/2004 Gomes ............. G01R 31/31917
                                                                  702/31
2006/0248410 A1* 11/2006 Circello ................ G06F 11/348
                                                                  714/38.13

OTHER PUBLICATIONS

Run-Time Power Estimation in High-Performance Microprocessors, Russ Joseph and Margaret Martonosi, Department of Electrical Engineering, Princeton University (6 pages).
Run-Time Power Estimation for Mobile and Embedded Asymmetric Multi-Core CPUs, Mather J. Walker et al., School of ECS, University of Southampton, Southampton S017 1BJ, UK (6 pages).
Run-Time Estimation of System and Sub-System Level Power Consumption, from Wikipedia, the free encyclopedia (11 pages).

* cited by examiner

*Primary Examiner* — Jermele M Hollington
*Assistant Examiner* — Feba Pothen
(74) *Attorney, Agent, or Firm* — Imperium Patent Works; Zheng Jin

(57) ABSTRACT

A dynamic power meter circuit receives a set of clock signals. The clock signals are summed by a clock sum adder, thereby generating a clock sum value. A dynamic power meter output value is generated based at least in part on the clock sum value. In one particular example, a dynamic power meter circuit receives clock signals and from them generates a clock sum model sub-value. The dynamic power meter circuit also receives event signals, and from them generates an architectural event model sub-value. A corresponding pair of clock sum model sub-value and architectural event model sub-value are then ratiometrically combined, thereby generating a dynamic power meter output value. Due to the use of both event signals and clock signals, a stream of dynamic power meter output values is generated that more closely tracks actual dynamic power of a circuit being monitored.

18 Claims, 12 Drawing Sheets

SYSTEM INVOLVING A DYNAMIC POWER METER CIRCUIT

CLOCK SIGNALS AND EVENT SIGNALS

CLOCK SIGNALS AND EVENT SIGNALS

CLOCK SIGNALS AND AN EVENT SIGNAL

| VALUE | NUMBER OF BITS | DESCRIPTION |
|---|---|---|
| WCS1 | 16 | FIRST CLOCK SUM WEIGHTING VALUE |
| WCS2 | 16 | SECOND CLOCK SUM WEIGHTING VALUE |
| ⋮ | ⋮ | ⋮ |
| WCS9 | 16 | 9TH CLOCK SUM WEIGHTING VALUE |
| TCS | 3 | TYPE OF CLOCK SUM SELECTION VALUE |
| K | 16 | RATIO K FOR COMBINING CLOCK AND EVENT MODEL SUB-VALUES |
| WES1 | 16 | FIRST EVENT SIGNAL WEIGHTING VALUE |
| WES2 | 16 | SECOND EVENT SIGNAL WEIGHTING VALUE |
| ⋮ | ⋮ | ⋮ |
| WESN | 16 | NTH EVENT SIGNAL WEIGHTING VALUE |
| TES | 3 | TYPE OF EVENT SIGNAL SUM SELECTION VALUE |
| OFFSET | 16 | OFFSET VALUE FOR THE LINEAR SUM |

VALUES STORED IN THE CONTROL REGISTERS

FIG. 8

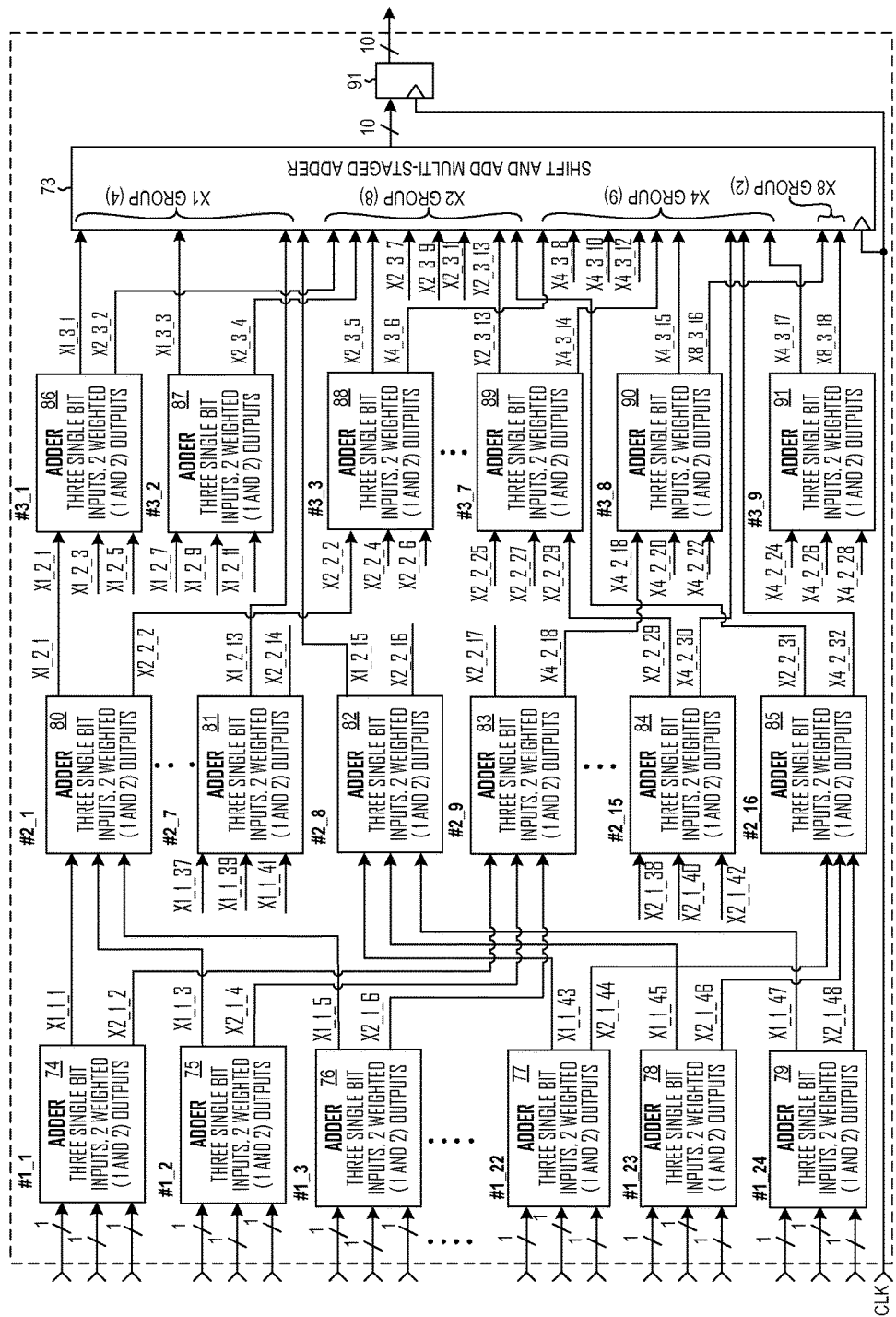
FIG. 9 CLOCK SUM ADDER #1

DIGITAL SUMMER CIRCUIT

AVERAGING CIRCUIT

OPERATION OF AVERAGING CIRCUIT

FLOW DESCRIPTION OF HOW A DPM OUTPUT
VALUE IS GENERATED

FLOW DESCRIPTION OF HOW A DPM OUTPUT VALUE IS GENERATED

DYNAMIC POWER METER WITH IMPROVED ACCURACY AND SINGLE CYCLE RESOLUTION

CROSS REFERENCE TO RELATED APPLICATIONS

This application claims the benefit under 35 U.S.C. 119 from provisional U.S. patent application Ser. No. 62/139,926, filed on Mar. 30, 2015, and from provisional U.S. patent application Ser. No. 62/160,109, filed on May 12, 2015. This application incorporates by reference the entire contents of provisional U.S. patent application Ser. No. 62/139,926, and of provisional U.S. patent application Ser. No. 62/160,109.

TECHNICAL FIELD

The described embodiments relate to dynamic power meters, and to related structures and methods.

BACKGROUND INFORMATION

Run time dynamic power determination has become critical in power and thermal constraint applications. Dynamic power refers to power consumed due to signal transitions due to running applications. Reliable dynamic power estimation enables circuits to deliver maximum performance while operating within power, thermal and power supply limits. Circuits known as dynamic power meters may be provided, along with a circuit whose dynamic power consumption is to be determined. The dynamic power meter circuit and the circuit it is monitoring may be parts of the same larger overall integrated circuit. If the circuit to be monitored is a processor, for example, then the processor may involve what are referred to as event counters or event registers. Event counters may also be referred to in the dynamic power meter arts as performance counters or hardware performance counters (HPCs) or performance monitoring counters (PMCs). The terms event counter and event register are used here.

When the processor performs a particular task or otherwise operates such that a particular "event" occurs, then a record of the event occurring is captured in a corresponding event counter or event register. A processor executing instructions may, for example, have a plurality of hardware event counters. One hardware event counter may, for example, increment each time the processor performs a particular type of complex instruction such as a floating point multiply. Another event counter may, for example, increment each time another type of event such as a cache miss occurs. Another event counter may, for example, increment each time a bus transaction occurs. A processor may have many such event counters or registers. The events being monitored and logged are typically microarchitectural events. The occurrence and/or frequency at which these microarchitecture events occur can be used as an indirect measure of the dynamic power being consumed by the processor. If, for example, the processor is idle and not executing instructions or is only performing a light processing load, then the actual power consumption of the processor may be known to be low, whereas if the same processor is doing heavy computational work and doing a lot of floating point multiplies and is experiencing a lot of cache misses and bus transactions and other microarchitectural events, then the actual power consumption of the processor may be known to be high. The dynamic power meter circuit reads or otherwise accesses the event counters and registers, and from the values of the event counters and registers makes an indirect determination or estimation of the dynamic power consumption of the processor, and then outputs a digital value indicative of the dynamic power consumption of the circuit. However, the accuracy and time resolution of such conventional methods is often unsatisfactory, especially for critical applications such as power supply over-current protection as well as reducing sudden load current increase induced voltage droop.

SUMMARY

A method is disclosed that involves determining dynamic power with single clock cycle resolution and much improved accuracy, thereby enabling better power and current management of a circuit being monitored. In one example, a novel dynamic power meter circuit receives a set of clock signals from a circuit being monitored. The clock signals are summed by clock sum adder circuitry, thereby generating a clock sum value. There can be one such clock sum value generated for each of several different areas of the circuit being monitored, where the clock signals used to generate a clock sum value all originate from that same area. Alternatively, there can be just one clock sum value generated, where the clock signals used to generate the single clock sum value originate from locations that are distributed fairly uniformly across the entire circuit being monitored. A dynamic power meter output value is then generated based at least in part on the clock sum value or values.

In one particular example, a dynamic power meter circuit receives clock signals and from them generates one or more clock sum values, and from the clock sum value or values generates a clock sum model sub-value. The dynamic power meter circuit also receives event signals, and from them generates an architectural event model sub-value. Each corresponding pair of clock sum model sub-value and architectural event model sub-value is then ratiometrically combined, thereby generating a stream of dynamic power meter output values. Due to the use of both event signal data and clock signal sum data in the generation of the dynamic power meter output values, a stream of dynamic power meter output values is generated that more closely tracks actual dynamic power of a circuit being monitored.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 8 is a diagram of the values stored in the control registers 48 of the dynamic power meter circuit 4 of FIG. 7.

FIG. 9 is a more detailed circuit diagram of one of the clock sum adder circuits of the dynamic power meter circuit 4 of FIG. 7.

FIG. 14 is a flowchart of a method 200 involving the dynamic power meter circuit 4 of FIG. 7.

DETAILED DESCRIPTION

Reference will now be made in detail to background examples and some embodiments of the invention, examples of which are illustrated in the accompanying drawings.

Figure 1:
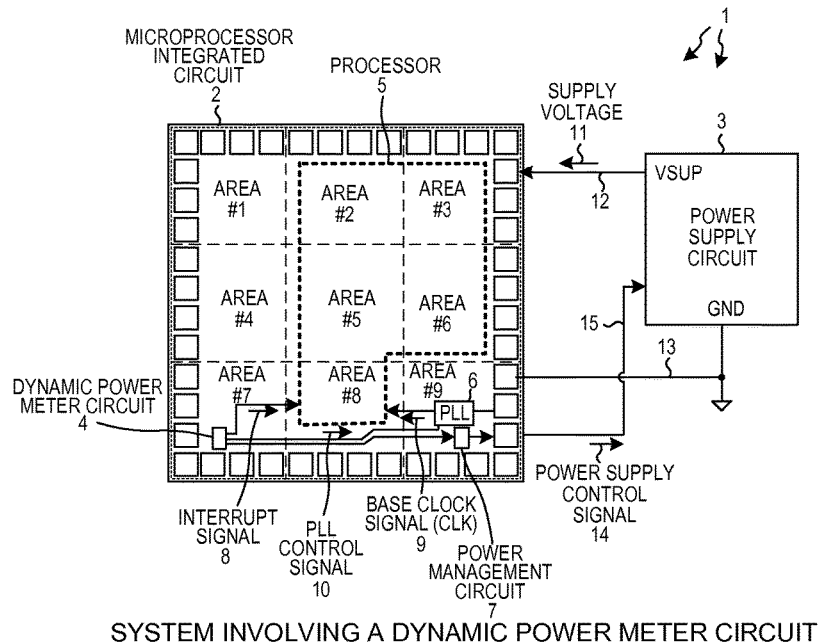
FIG. 1 is a diagram of a system involving a dynamic power meter circuit in accordance with one novel aspect.

FIG. 1 is a diagram of a system 1 involving a dynamic power meter circuit in accordance with one novel aspect. The system 1 includes an integrated circuit 2 and a power supply circuit 3. The integrated circuit 2 includes a dynamic power meter circuit 4, a processor 5, a phase-locked loop (PLL) circuit 6, a power management circuit 7, and other circuits. The dynamic power meter circuit 4 is to monitor the remainder of the integrated circuit, including the processor 5, and to make an estimation of that circuitry's dynamic power consumption, and to generate a dynamic power meter output value. As the dynamic power meter circuit 4 operates, it outputs a stream of such dynamic power meter output values. Each dynamic power meter output value is a multi-bit digital value that is indicative of the level of power consumption of the remainder of the integrated circuit at that approximate time. There are nine areas of the integrated circuit 2, denoted Area#1 through Area#9. The dynamic power meter circuit 4 is controllable so that it separately monitors dynamic power consumption in each of these areas, or alternatively so that it monitors dynamic power consumption across all or a selected subset of these areas.

In a first example of the system 1, an interrupt signal 8 is generated based at least in part on the dynamic power meter output values. For example, if a dynamic power meter output value of the stream of dynamic power meter output values is determined to exceed a predetermined threshold value, then the interrupt signal 8 is asserted, otherwise the interrupt signal is not asserted. Assertion of the interrupt signal results in the processor being interrupted. In a second example of the system 1, the processor 5 is clocked by a processor base clock signal CLK 9. The processor base clock CLK is generated by the PLL 6 and is supplied by the PLL 6 to the processor 5. The PLL 6 can be controlled to change the frequency of the processor base clock CLK by a PLL control signal 10. The PLL control signal 10 is generated based at least in part on the dynamic power meter output values. For example, if a dynamic power meter output value of the stream of dynamic power meter output values exceeds a predetermined threshold value, then the PLL control signal 10 as supplied to the PLL may cause the PLL to reduce the frequency of the processor base clock signal CLK. In a third example of the system 1, the integrated circuit 2 is powered by the power supply circuit 3. The power supply circuit 3 outputs and supplies a supply voltage VSUP 11 to the integrated circuit 2 via supply conductor 12. Conductor 13 is a ground conductor. The power management circuit 7 of the integrated circuit 2 receives the stream of dynamic power meter output values. The power management circuit 7 generates a power supply control signal 14 based at least in part on the stream of dynamic power meter output values. For example, if a dynamic power meter output value of the stream of dynamic power meter output values exceeds a predetermined threshold value, then the power supply control signal 14 supplied via conductor 15 to the power supply circuit 3 may cause the power supply circuit 3 to change a current limit setting of the power supply circuit. The current limit setting is just one example of a power supply setting that could be changed. Other examples include the voltage supplied to the integrated circuit, an overvoltage protection setting, or an overcurrent protection setting. The power supply circuit can be controlled, based on dynamic power meter output value data, to turn on, or to turn off. The power management circuit 7 can also, without controlling any external power supply, control the integrated circuit 2 to go into a power down sleep mode, or can cause certain parts of the integrated circuit to be powered off. Accordingly, the dynamic power meter circuit 4 can supply information to a circuit whose dynamic power consumption is being monitored, and/or to a power management circuit that controls how the circuit being monitored is powered, and/or to a circuit that controls how the circuit being monitored is being clocked.

Figure 2:
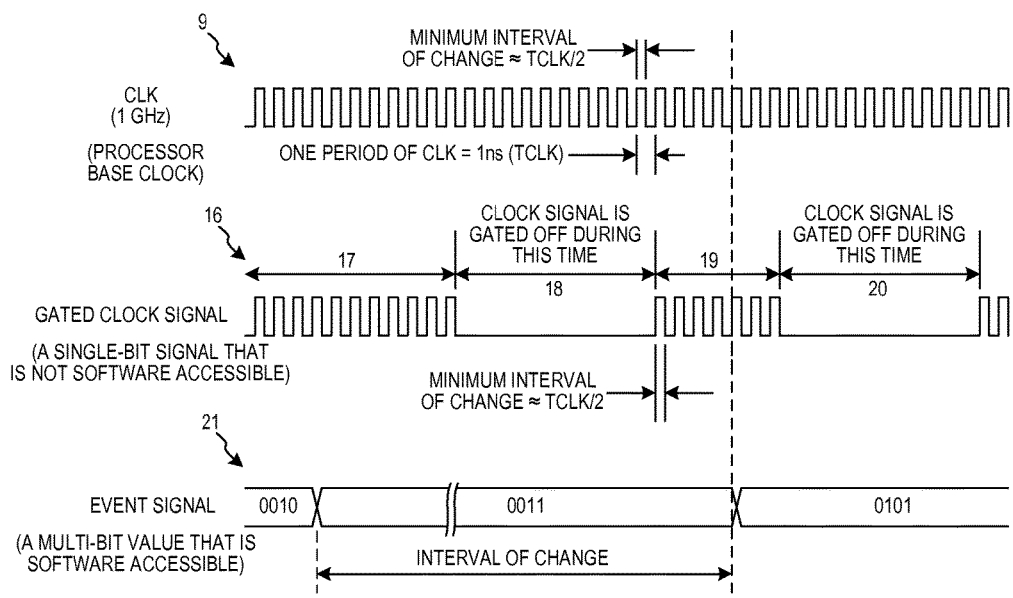
FIG. 2 is a diagram that illustrates two types of signals that are present in the integrated circuit of FIG. 1, namely clock signals and event signals.

FIG. 2 is a diagram that illustrates two types of signals that are present in the integrated circuit 2. One type of signal is a so-called "clock signal". The other type of signal is a so-called "event signal". The processor base clock CLK 9 is an example of a clock signal. The processor base clock CLK 9 is illustrated in uppermost waveform of FIG. 2. The signal has a minimum interval of change of TCLK divided by two, where TCLK is the period of the base clock signal. In the present example, TCLK is one nanosecond and the frequency of the base clock CLK is one gigahertz. This is the clock signal that clocks the processor 5. Another example of a clock signal is a gated version of the base clock signal. Such a gated clock signal 16 is illustrated in the middle waveform of FIG. 2. Like the base clock signal 9 from which the gated clock signal 16 is derived, the minimum interval of change of the gated clock signal 16 is also TCLK divided by two. Typically, a gated clock signal switches like the base clock signal at the same frequency and in the same way for a period of cycles, and then the switching of the gated clock signal is gated off such that the gated clock signal does not switch at all for another number of clock cycles. In the example of FIG. 2, the gated clock signal 16 switches and is not gated off during periods 17 and 19, and the gated clock signal is gated off during period 18 and 20. Another type of clock signal that is not shown in FIG. 2 is a buffered version of a gated clock signal. Such a buffered version of a gated clock signal has the same waveform as the gated clock signal from which it is derived, except that it is delayed by some amount due to the fact that it is generated from the gated clock signal by a buffer circuit that has a propagation delay. None of these clock signals is a software accessible signal in the sense that the value of the clock signal at a given time can be read by software executing on the processor. None of these clock signals is a multi-bit digital signal, but rather these signals are single-bit signals. Typically each of these signals drives one or more clock terminal inputs of one or more sequential logic elements (for example, a digital logic latch or a digital logic flip-flop).

An example of the other type of signal illustrated in FIG. 2, a so-called "event signal" 21, is illustrated in the bottom-most waveform of FIG. 2. An example of an event signal is the multi-bit digital value that is output by an event counter or an event register. Although an event signal theoretically could change once in response to a first rising edge of the base clock signal, and could then change again in response to the next rising edge of the base clock signal, an event signal does not change repeatedly at this rapid rate for many cycles. To the contrary, an event signal on average changes at a much slower rate. The minimum interval of change of an event signal is equal to or greater than TCLK. If, for example, the event signal is the output of an event count that counts the number of times the processor completes execution of a particular type of instruction, then the event signal would increment at a much slower rate than the processor base clock. In contrast to the single-bit clock signals, an event signal can be a multi-bit digital signal. In contrast to a clock signal whose value is not software accessible, the multi-bit digital value of an event signal is often software-accessible in that the value of the event signal can be read by software. In the example of FIG. 2, the multi-bit digital value of the event signal is "0010" during a first number of base clock cycles, and then is "0011" during a second number of base clock signals, and then is "0101" during a third number of base clock signals.

Figure 3:
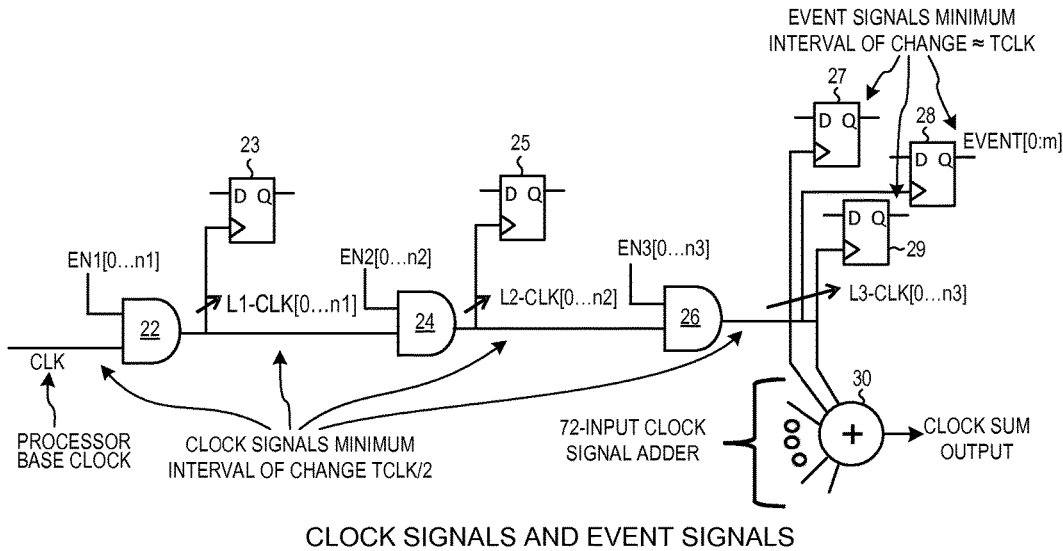
FIG. 3 is a circuit diagram that illustrates where clock signals and event signals might be present in a circuit being monitored.
Figure 4:
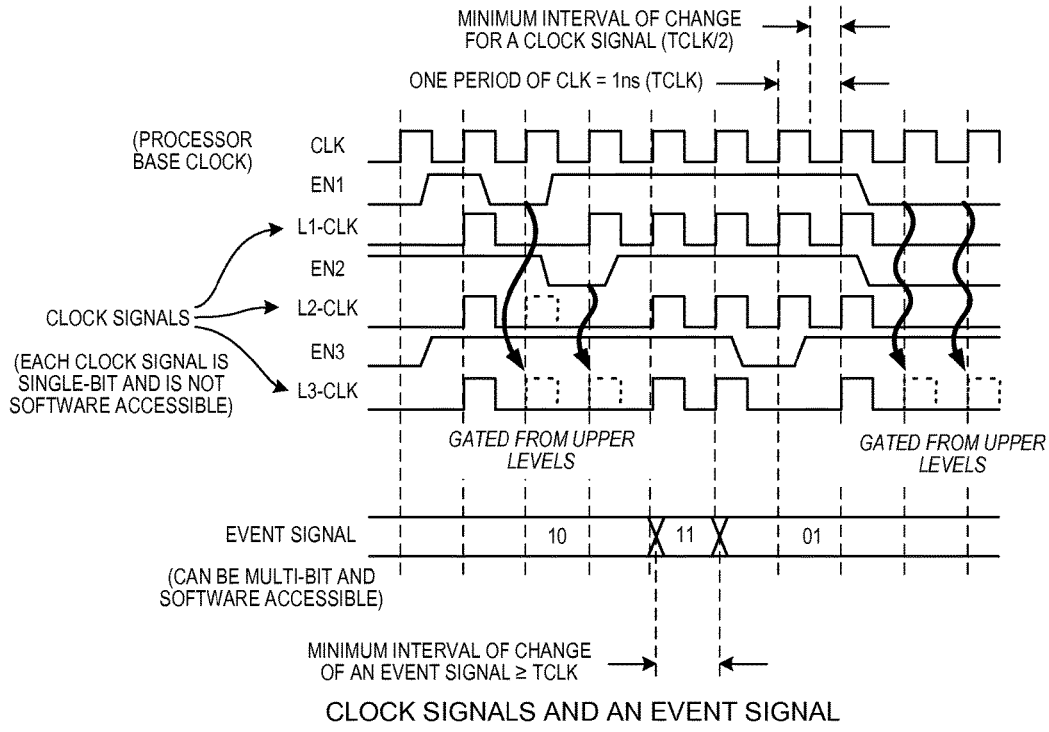
FIG. 4 is a waveform diagram that illustrates various types of clock signals, as well as an event signal.

FIG. 3 is a diagram that illustrates circuitry where clock signals and event signals are present. FIG. 4 is a waveform diagram that illustrates signals present in the circuitry of FIG. 3. Level one gated clock signals L1-CLK[0 . . . n1] are generated by gates 22 from the base clock signal CLK. The gating signals EN1[0 . . . n1] control this gating. Each of these level one (L1) gated clock signals directly clocks a plurality of flip-flops represented by flip-flop symbol 23. The gated clock signals L2-CLK[0 . . . n2] are in turn generated by gates 24 from the level one gated clock signals L1-CLK[0 . . . n1]. The gating signals EN2[0 . . . n2] control this gating. Each of the resulting level 2 gated clock signals directly clocks a plurality of flip-flops represented by flip-flop symbol 25. Likewise, the level three gated clock signals L3-CLK[0 . . . n3] are in turn generated by gates 26 from the level two gated clock signals L2-CLK[0 . . . n2]. The gating signals EN3[0 . . . n3] control this gating. Each of the resulting level 3 gated clock signals directly clocks a plurality of flip-flops represented by flip-flop symbols 27-29. As is explained in further detail below, selected ones of the various types of clock signals illustrated in FIG. 3 are supplied as inputs to clock sum circuitry 30 of a dynamic power meter circuit. Note that the minimum interval of change of the signal output by the flip-flops 27-29 is TCLK, whereas the minimum interval of change of the clocks signals is TCLK divided by two.

In accordance with one novel aspect, a dynamic power meter circuit includes a clock sum adder circuit that outputs a clock sum value, where the clock sum value is a multi-bit digital value count of the number of the incoming clock signals that had a predetermined digital logic value (a digital logic "high") during a predetermined part of a clock period of the base clock signal. If, for example, seventy-two input clock signals were received by the clock sum adder circuit and twenty-five of these signals had digital logic high values at a particular time in a first clock cycle of the base clock signal, then the clock sum adder circuit might output a clock sum value of twenty-five. If, for example, only twelve of these seventy-two input clock signals had digital logic high values at a particular time in a second clock cycle of the base clock signal, then the clock sum adder circuit might output a clock sum value of twelve.

Figure 5:
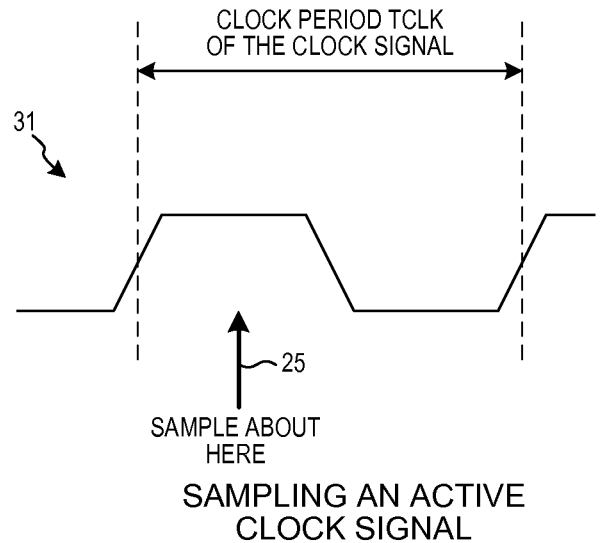
FIG. 5 is a diagram that illustrates when the value of an incoming ungated clock signal is sampled by a clock sum adder circuit.

FIG. 5 is a diagram that illustrates when the value of an incoming clock signal 31 is sampled by such a clock sum adder circuit. In this example, the clock signal is an active clock signal and is not gated off during the period illustrated. The clock signal therefore switches during the clock cycle. The clock sum adder circuit samples or detects the value of the clock signal at the point in time in the period of the clock signal represented by arrow 32. This sample time is about midway during the first half of the cycle when the clock signal value would be high, if the clock signal were switching.

Figure 6:
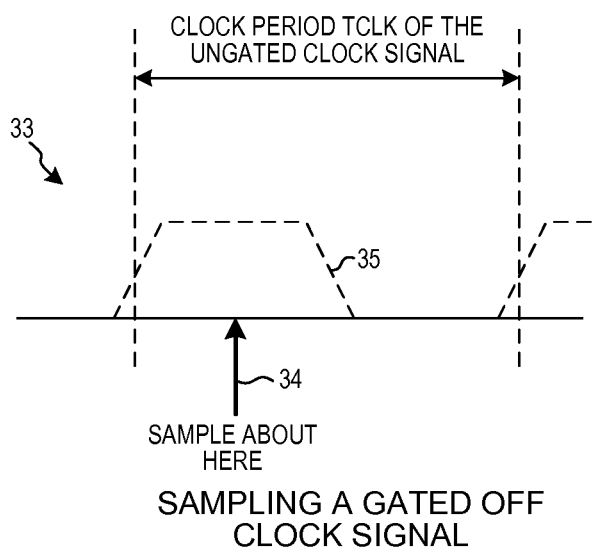
FIG. 6 is a diagram that illustrates when the value of an incoming gated clock signal is sampled by a clock sum adder circuit.

FIG. 6 is a diagram that illustrates when the value of an incoming gated clock signal 33 is sampled by such a clock sum adder circuit. In this example, the clock signal is gated off (i.e., is not active) during the illustrated period. The clock signal therefore does not switch during the clock cycle illustrated, but rather remains at a digital logic low value. The clock sum adder circuit samples or detects the value of the clock signal at the point in time in the period of the clock signal represented by arrow 34. This sample time is about midway during the time when the clock signal value would be high, if the clock signal were switching. The dashed line 35 represents how the gated clock signal would have switched were it not gated off during the illustrated clock period.

Figure 7:
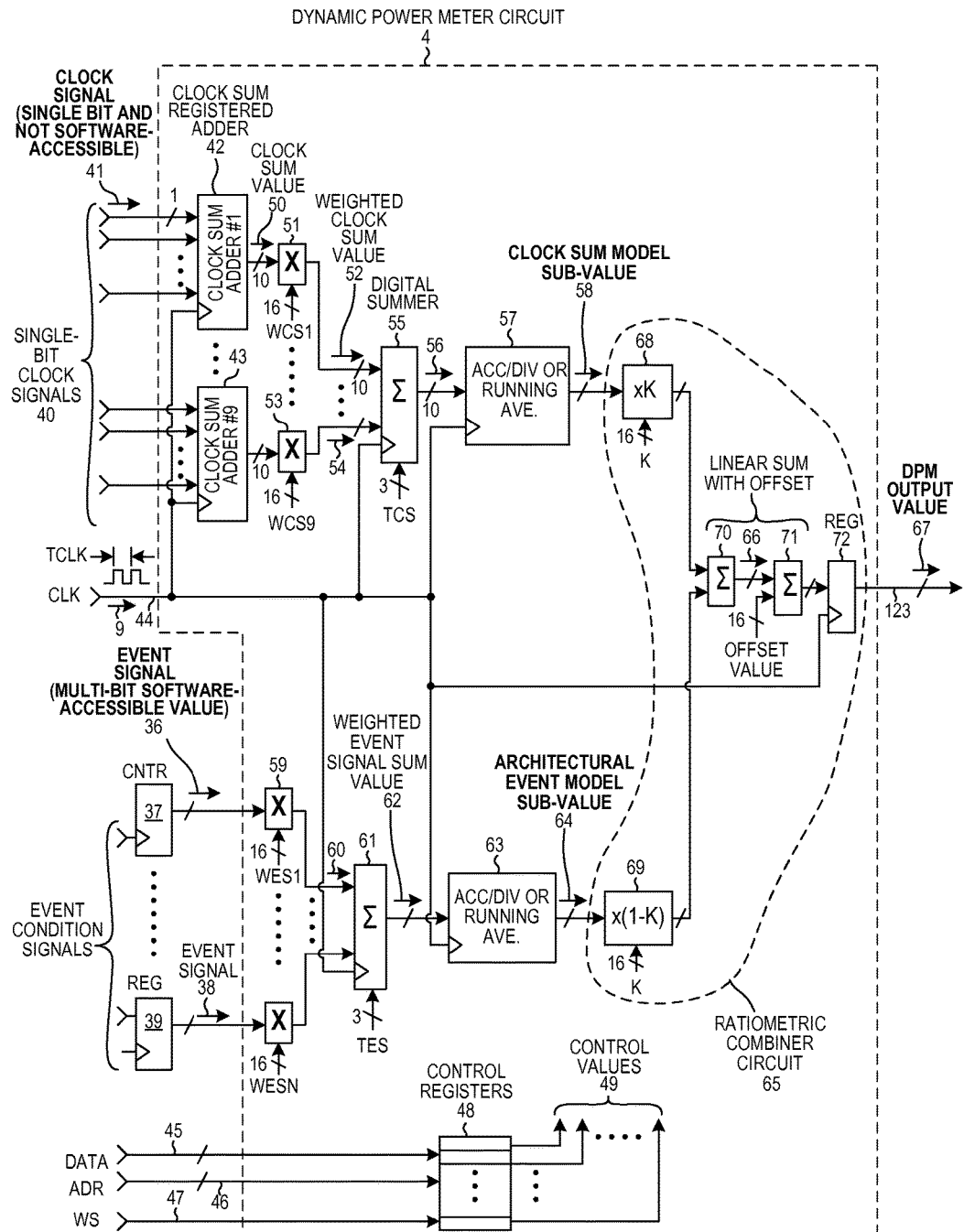
FIG. 7 is a circuit diagram of the dynamic power meter circuit 4 of the integrated circuit 2 of FIG. 1.

FIG. 7 is a more detailed circuit diagram of the dynamic power meter circuit 4 of FIG. 1. The dynamic power meter circuit 4 receives a plurality of event signals. Two examples are illustrated. Event signal 36 is output by event counter 37. Event signal 38 is output by event register 39. In addition to event signals, the dynamic power meter circuit 4 also receives many single-bit clock signals 40. The clock signals are clock signals and buffered clock signals and gated clock signals and buffered gated clock signals as described above in connection with FIG. 2, FIG. 3 and FIG. 4. Arrow 41 represents one of these clock signals. A first set of these clock signals is received onto the dynamic power meter circuit 4 via a first clock sum adder circuit 42. In the illustrated example, there are nine such sets of clock signals, each being received by a corresponding one of nine clock sum adder circuits. The ninth clock sum adder circuit 43 is illustrated in FIG. 7. In addition, the dynamic power meter circuit 4 receives the base clock signal 9 via input terminal and conductor 44. Various control values that control the operation of the dynamic power meter circuit are loaded into the dynamic power meter circuit 4 using data conductors 45, address conductors 46, and a write strobe conductor 47. These control values, which are multi-bit digital values, are written into and are stored into a set of control registers 48. The control values 49, as output from the control registers 48, are supplied to the remainder of the dynamic power meter circuit 4. These control values control and configure the various sub-circuits of the dynamic power meter circuit.

Each clock sum adder circuit, such as clock sum adder circuit 42, outputs a multi-bit digital value that indicates the number of the incoming clock signals as received by the clock sum adder circuit that has a digital logic high value during a particular period of the base clock signal. The clock sum value output by clock sum adder circuit 42 is identified by reference numeral 50. In the present example, this value 50 is a 10-bit digital value.

Each of the ten-bit clock sum values as output by the clock sum adder circuits is multiplied by a corresponding one of a plurality of weighting values, thereby generating a corresponding weighted clock sum value. In the present example, there are nine clock sum adder circuits so there are nine weighting values. There is one multiplier provided to perform each such weighting multiplication operation. In the example of FIG. 7, the first weighting multiplier 51 multiplies the first 10-bit clock sum value 50 as output by the first clock sum adder 42 by the first 16-bit weighting value WCS1, thereby generating the first 10-bit weighted clock sum value 52. Similarly, the ninth multiplier 53 multiplies the 10-bit clock sum value as output by the clock sum adder 43 by the ninth 16-bit weighting value WCS9, thereby generating the ninth 10-bit weighted clock sum value 54. The resulting nine 10-bit weighted clock sum values are supplied to a digital summer circuit 55.

The digital summer circuit 55 is controlled by a control value TCS to sum the nine 10-bit weighted clock sum values. In the example of the control value TCS having a particular value, the digital summer 55 outputs a 10-bit sum value 56 that is a straight sum of all of the nine incoming 10-bit weighted clock sum values. The 10-bit sum value 56 is supplied to an accumulate and divide or running average circuit 57. In the present example, the circuit 57 sums thirty-two consecutive sum values, and divides the resulting sum by thirty-two, thereby generating an average of the last thirty-two sum values. One such average value is output by the circuit 57 each thirty-two base clock cycles. These average values as output by circuit 57 are referred to as "clock sum model sub-values". Reference numeral 58 identifies one such "clock sum model sub-value".

Each event signal is multiplied by a corresponding weighing value so as to generate a corresponding weighted event signal. For example, a multiplier 59 multiplies event signal 36 by a 16-bit weighting value WES1, thereby generating a weighted event signal 60. Each of the event signals has a corresponding multiplier and a corresponding weighting value, so that a corresponding weighted event signal is generated. These weighted event signals are supplied to a digital summer circuit 61. The digital summer circuit 61 is controlled by a control value TES to sum the weighted clock sum values. In the example of the control value TES having a particular value, the digital summer 61 outputs a sum value 62 that is a straight sum of all of the incoming weighted clock sum values. The sum value 62 is supplied to an accumulate and divide or running average circuit 63. In the present example, the circuit 63 sums thirty-two consecutive "weighted event signal sum values", and divides the resulting accumulated sum by thirty-two, thereby generating an average of the last thirty-two "weighted event signal sum values". One such average value is output by the circuit 63 each thirty-two base clock cycles. These average values are referred to as "architectural event model sub-values". Reference numeral 64 identifies one such "architectural event model sub-value".

Each corresponding pair of "clock sum model sub-value" and "architectural event model sub-value" is then ratiometrically combined by a ratiometric combiner circuit 65, so as to generate a ratiometrically combined value. In the example of FIG. 7, the "clock sum model sub-value" 58 is ratiometrically combined with the "architectural event model sub-value" 64, thereby generating a ratiometrically combined value 66. An offset value is then added to the ratiometrically combined value 66, thereby generating a dynamic power meter output value 67.

More particularly, a ratio value K is stored in the control registers 48. A multiplier 68 weights the "clock sum model sub-value" 58 by the ratio value K, thereby generating a weighted "clock sum model sub-value". Likewise, a multiplier 69 weights the "architectural event model sub-value" 64 by a value (1−K), thereby generating a weighted "architectural event model sub-value". The weighted "clock sum model sub-value" and the weighted "architectural event model sub-value" are then summed by a summer circuit 70, thereby generating the ratiometric sum value 66. A second summer circuit 71 then adds the offset value to the ratiometric sum value 66, and the result is the DPM output value 67 that is registered in an output register 72.

FIG. 8 is a diagram of the values stored in the control registers 48 of FIG. 7. The 3-bit value TCS determines the type of clock sum selection that will be used. With one setting of TCS, the digital summer 55 outputs a straight sum of all the nine incoming weighted clock sum values. With another setting of TCS, however, a selected one of the nine weighted clock sum values is made a part of the sum, so effectively the other nine weighted clock sum values are ignored and are not included in the "clock sum model sub-value". In addition, in one embodiment, the clock signals supplied to each respective one of the clock sum adder circuits derive from one of the areas of the integrated circuit. Accordingly, each of the nine areas of the integrated circuit has its own weighted clock sum value. By controlling the TCS setting, the dynamic power of a particular one of the nine areas can be monitored and estimated, separate and apart from the other areas. Likewise, the TES control value has different settings. By changing the TES control value, different ones of the event signals can be separated and isolated from the other event signals and included in the architectural event model sub-value. By monitoring clock signal and event signals deriving from one area of the integrated circuit, and by ignoring clock signals and event signals deriving from other areas, a dynamic power meter output value for a selected area of the integrated circuit can be generated.

In one particular example, the offset value is a fixed point 16-bit value that can be either a positive or negative number. The ratio value K, on the other hand, is an 16-bit fixed point value that cannot be negative. There is only one clock sum adder circuit, and this clock sum adder circuit 42 receives clock signals that derive from locations that are fairly evenly distributed across substantially the entire area of the integrated circuit. This single clock sum adder circuit 42 receives seventy-two such clock signals. There is therefore only one weighting value WCS1, and only one weighted clock sum value is generated. In this specific example, there are no separate multipliers 68 and 69 for performing the multiplication to carry out of the ratiometric summing, but rather the weighting value WCS1 and the weighting values for the event signals are scaled so that the "clock sum model sub-value" 58 and the "architecture event model sub-value" 64 are output by the circuits 57 and 63 in weighted condition as if they had already been multiplied by K and 1−K respectively. Separate multipliers 68 and 69 are therefore not required. In some examples the sum values and weighting values are ordinary fixed point digital values, whereas in other examples the sum values and weighting values include a signed integer portion, and a fractional portion. The control values need not be stored in control registers as illustrated in FIG. 7, but rather these values may be hardwired, or may be stored in anti-fuses, or may be stored in other one-time programmable (OTP) elements.

FIG. 9 is more detailed circuit diagram of the clock sum adder circuit 42 of FIG. 7. The shift and add multi-staged adder circuit 73 of FIG. 9 is shown in further detail in FIG. 10. At the left of the diagram of FIG. 9, there is shown seventy-two incoming single-bit clock signals. Each group of three input clock signals is received by a corresponding one of twenty-four adder circuits, denoted #1_1 through #1_24. Six of these twenty-four adder circuits 74-79 are pictured. There is also a second column of sixteen adder circuits denoted #2_1 through #2_16, six of which 80-85 are pictured. There is also a third column of nine adder circuits denoted #3_1 through #3_9, six of which 86-90 are pictured. Each of these adder circuits is identical to every other one. An adder circuit receives three clock signals, and outputs a 2-bit digital value. The 2-bit digital value is the number of the three incoming clock signals whose digital value was a digital logic high during a clock period. The X1 output bit is the least significant bit. The X2 output bit is the most significant bit. The 10-bit output of the shift and add multi-staged adder 73 is registered by a 10-bit register 91.

Figure 10:
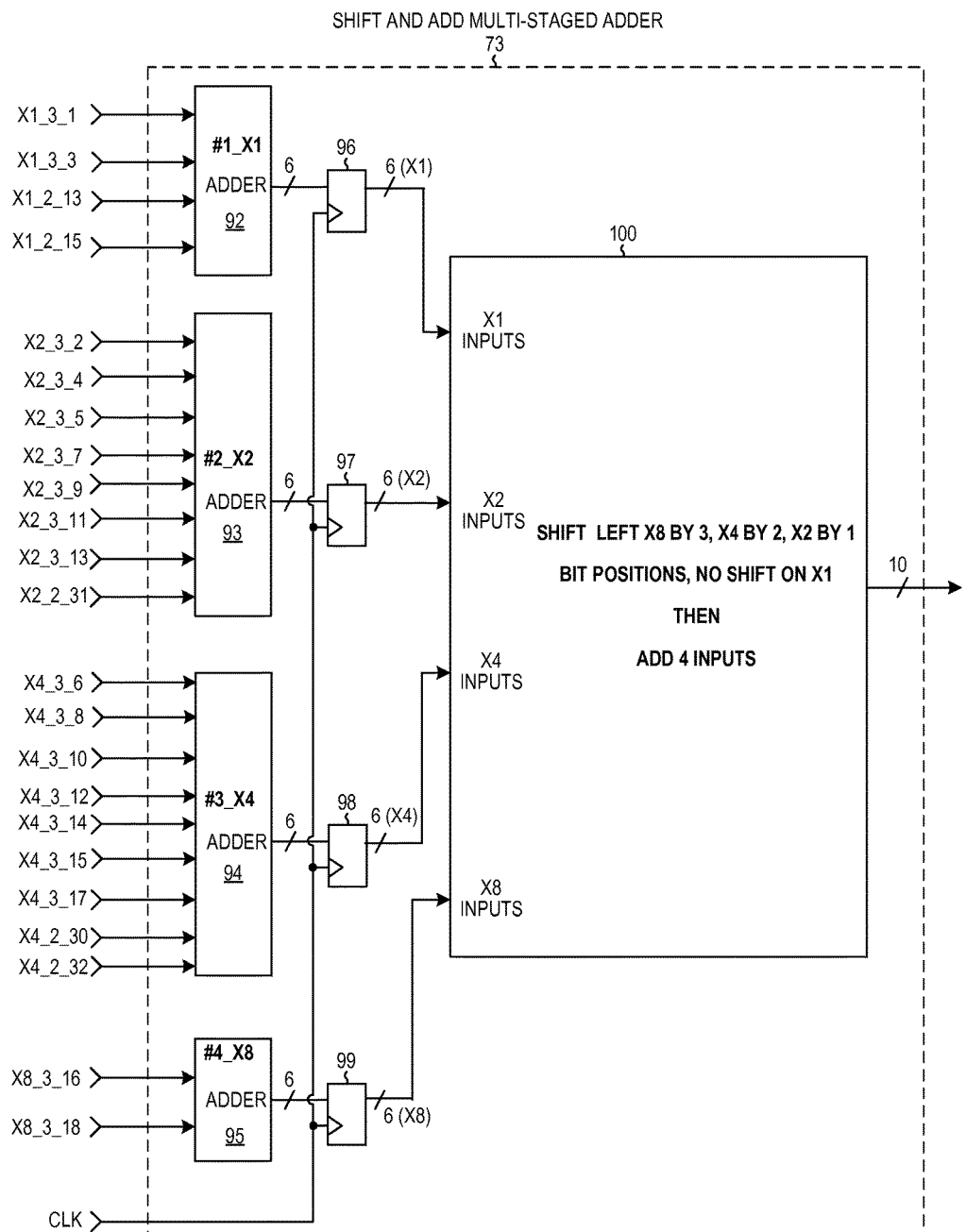
FIG. 10 is a more detailed circuit diagram of the shift and add multi-staged adder of FIG. 9.

In FIG. 10, the #1_X1 adder 92 is a summer that outputs a 6-bit digital value which indicates the number of the four input signals that are digital logic high values. Likewise, the #2_X2 adder 93 is a summer that outputs a 6-bit digital value which indicates the number of the eight input signals that are digital logic high values. Likewise, the #3_X4 adder 94 is a summer that outputs a 6-bit digital value which indicates the number of the nine input signals that are digital logic high values. Likewise, the #4_X8 adder 95 is a summer that outputs a 6-bit digital value which indicates the number of the two input signals that are digital logic high values. These 6-bit sum values are registered by a set of 6-bit registers 96-99. A shift and add circuit 100 receives the registered 6-bit values, and shifts the X8 value left by three bit positions, and shifts the X4 value left by two bit positions, and shifts the X2 value left by one bit position. The X1 value is not shifted. The resulting values and then added, thereby generating a 10-bit sum value.

Figure 11:
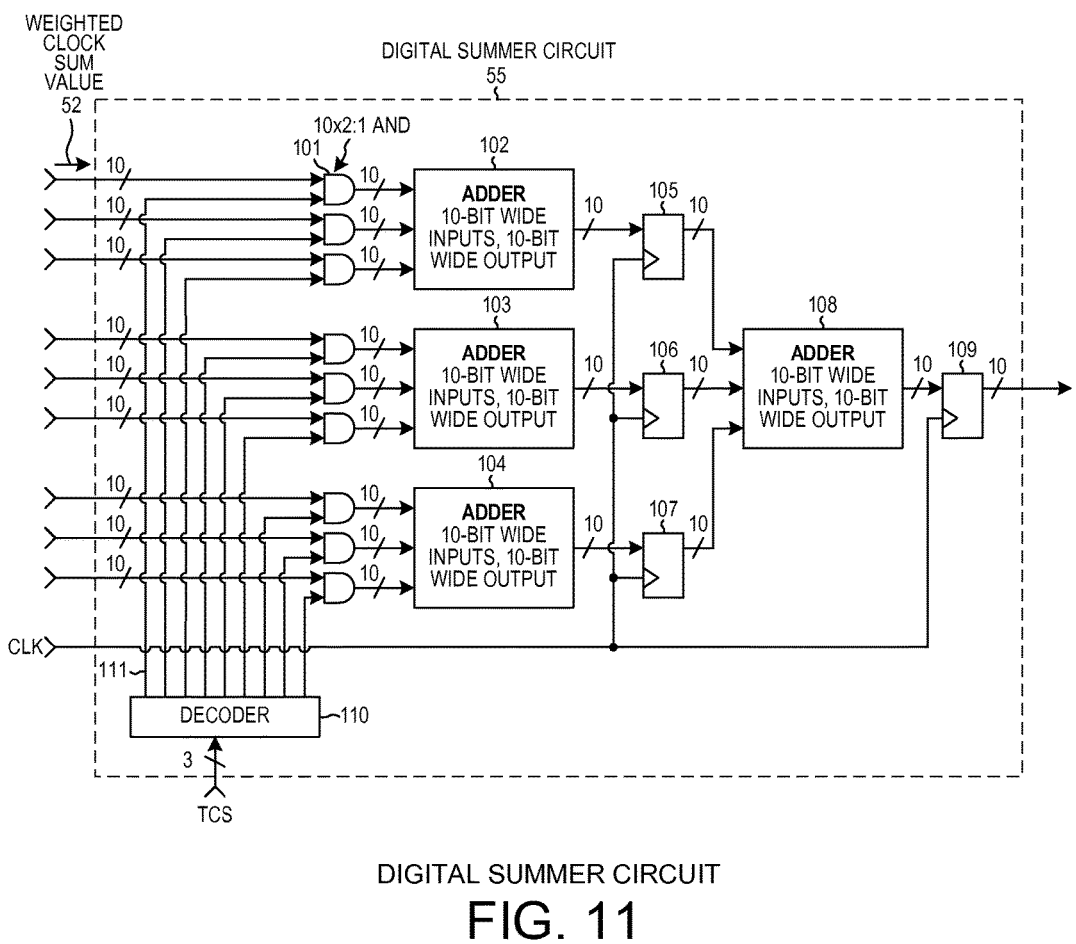
FIG. 11 is a circuit diagram of the digital summer circuit 55 of the dynamic power meter circuit 4 of FIG. 7.

FIG. 11 is a more detailed circuit diagram of the digital summer circuit 55 of FIG. 7. Each of the nine 10-bit weighted clock sum values is selectably gated off and blocked by a corresponding one of nine sets of ten 2:1 AND gates. For example, the ten 2:1 AND gates 101 can selectably block the 10-bit weighted clock sum value 52 from reaching adder 101. There are nine such sets of 2:1 AND gates and three adders 102-104. One input lead of each of these ten 2:1 AND gates are connected together, and are also connected to a corresponding output lead of a decoder 110. To keep the digital summer circuit 55 fully synchronous, the sum output values of the first stages of adders 102-104 are registered by registers 105-107, and then these three sum output values are summed by adder 108. The resulting 10-bit sum as output by adder 108 is then registered by 10-bit register 109. The incoming TCS control value is decoded by decoder 110, so that various ones of the weighted clock sum values will be selectably blocked by the sets of 2:1 AND gates, depending on what the TCS control value is. For example, if the weighted clock sum value 52 were to be blocked, and not included in the sum value as output by the digital summer circuit 55, then the decoder 110 would output a digital logic "0" value onto output lead and conductor 111. Due to the digital "0" on conductor 111, the AND gates 101 would output digital logic "1" values regardless of the value of the incoming 10-bit weighted clock sum value 52. Otherwise, if the weighted clock sum value 52 were not to be blocked, but rather were to be included in the sum value as output by the digital summer circuit 55, then the decoder 110 would output a digital logic "1" value onto output lead and conductor 111.

Figure 12:
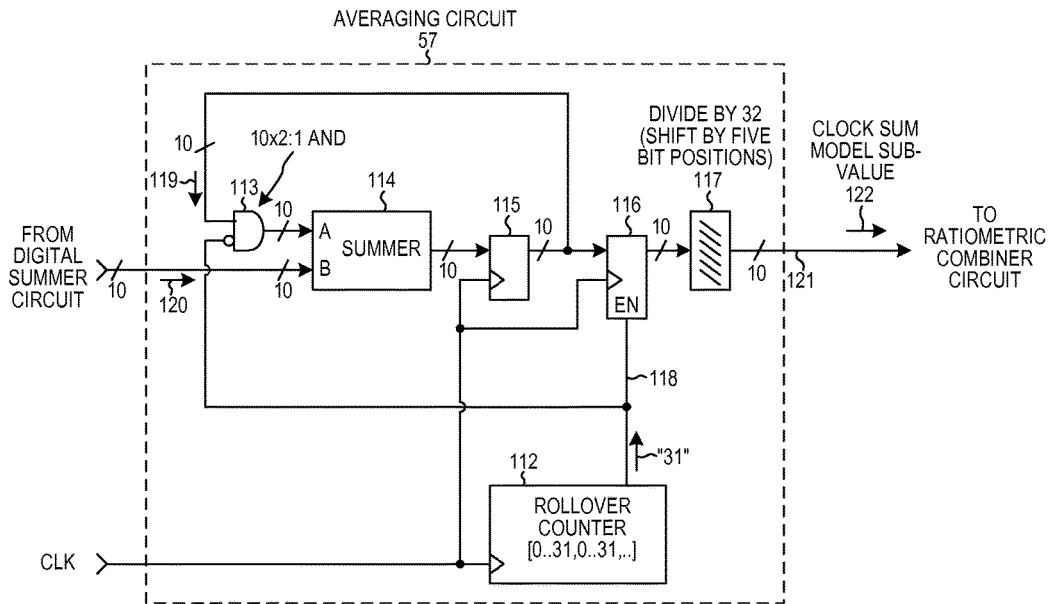
FIG. 12 is a circuit diagram of the averaging circuit 57 of the dynamic power meter circuit 4 of FIG. 7.
Figure 13:
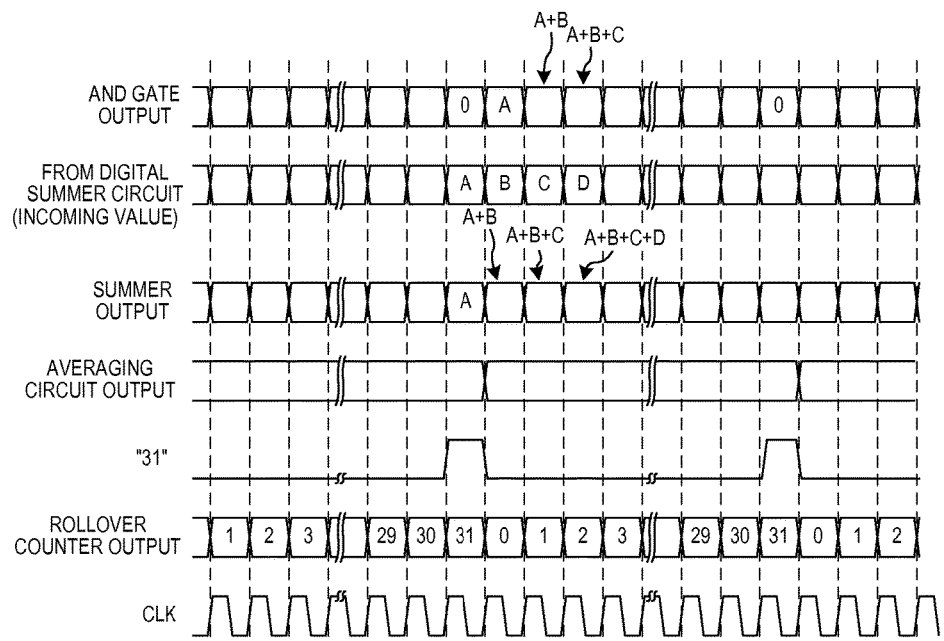
FIG. 13 is a waveform diagram that illustrates an operation of the averaging circuit 57 of FIG. 12.

FIG. 12 is a more detailed circuit diagram of one example of the averaging circuit 57 of FIG. 7. FIG. 13 is a waveform diagram showing operation of the averaging circuit 57 of FIG. 12. The averaging circuit 57 includes a rollover counter 112, a set of ten 2:1 AND gates 113, a 10-bit summer 114, a 10-bit register 115, a 10-bit register 116, and a shifting circuit 117. The counter 112 counts from "0" up to "31", and then rolls over back to "0", and then counts up to "31" again, as so forth. When the counter is outputting a count of "31", the "31" signal on conductor 118 is asserted to a digital logic high. Therefore, at the end of the count period of "31", the AND gates 113 are blocking the return value 119 from reaching the A input of the summer 114. Consequently at the very beginning of the period of count "0", the incoming value 120 is the only value that is being supplied to summer 114. The first value, which has passed through the summer, si therefore clocked into register 115 at the beginning of the "0" count period. At the beginning of the next count period "1", the first count as registered in register 115 was being supplied onto the A input of the summer because during the "0" count period the "31" signal is no longer asserted. At the beginning of the next period "1", the second input value was supplied onto the B input of the summer. Therefore, at the beginning of the next count period "1", the sum of the first and second counts is clocked into register 115. As the counter 112 increments, each successive input value is accumulated into the sum and is clocked into register 115. Once thirty-two input values have been accumulated, the accumulated result is present in register 115. At the end of the "31" count period, the register 116 is enabled due to the "31" signal being asserted on the enable input of register 116. At the beginning of the "0" count period, the register 116 is clocked and loads the accumulated value from register 115. The accumulated value, as output by register 116, is then effectively divided by thirty-two due to the shifting of five bit positions by shifter 117. In this way, each consecutive thirty-two input values are summed, and the resulting sum is divided by thirty-two, and the resulting average value is output on leads 121 as a "clock sum model sub-value" 122. A new value appears on leads 121 at the beginning of each "0" count period. The averaging circuit 57 therefore outputs a stream of "clock sum model sub-values".

Figure 14A:
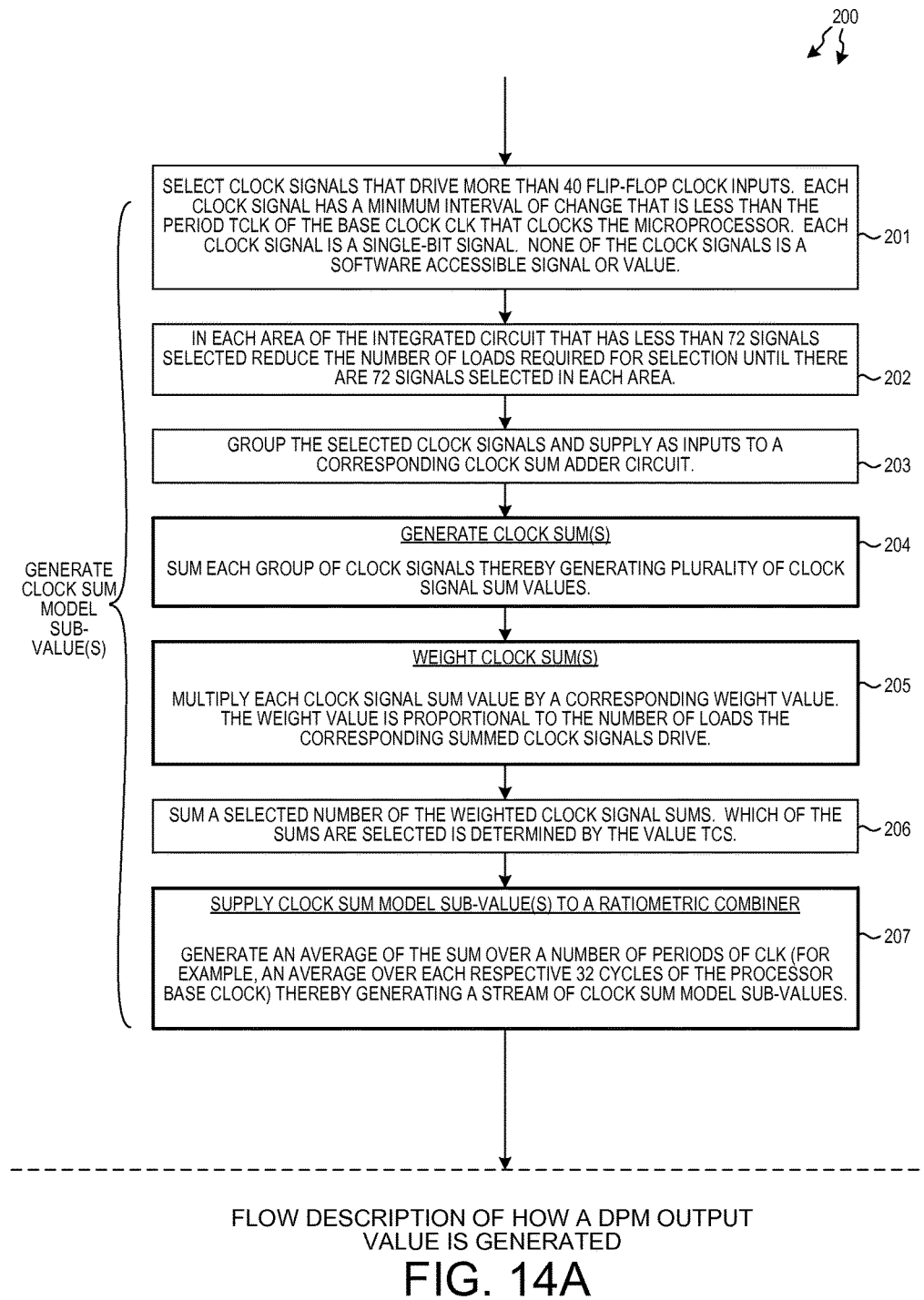
FIG. 14A is a first part of a larger flow chart of FIG. 14.
Figure 14B:
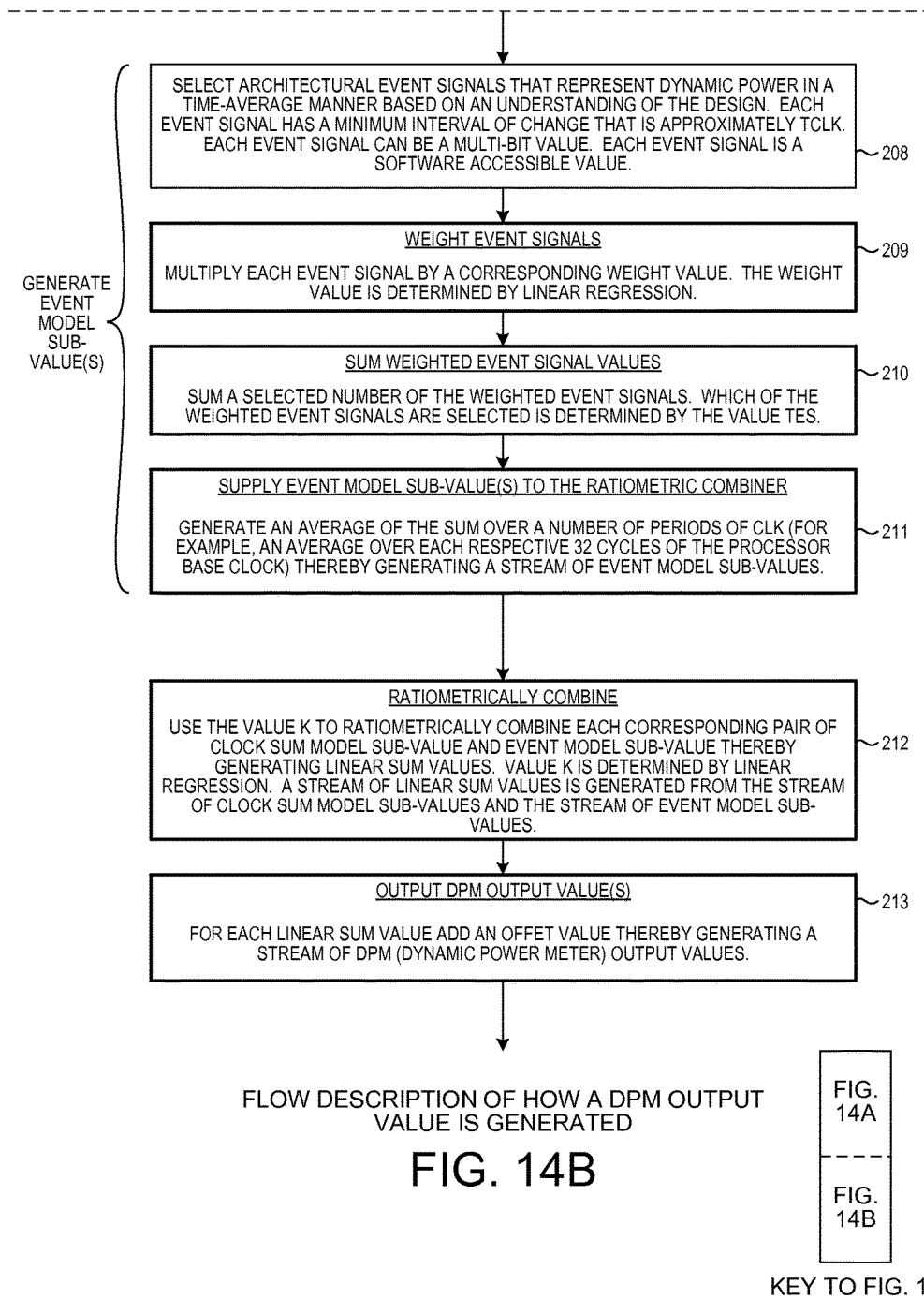
FIG. 14B is a second part of the larger flow chart FIG. 14.

FIG. 14A and FIG. 14B together form a larger flowchart of FIG. 14. The flowchart is of a method 200 of design and operation of the dynamic power meter circuit 4 of FIG. 1. Initially, the clock signals in the circuit to be monitored are analyzed, and those clock signals that drive more than forty loads (for example, flip-flop clock input terminals) are selected (step 201). The most heavily loaded seventy-two of these signals in each of the nine areas Area#1 through Area#9 are selected. If, by this process, an area has less then seventy-two clock signals selected, then for that area the number of loads required for selection is reduced (step 202) until there are seventy-two qualifying clock signals. Those selected clock signals of the first area are grouped and supplied as inputs to the first clock sum adder 42 of FIG. 7. Those selected clock signals of the second area are grouped and supplied as inputs to the second clock sum adder of FIG. 7, and so forth. The clock signals of each of the nine groups of clock signals are supplied as inputs to a corresponding one of the nine clock sum adders at the upper left of FIG. 7. These steps 201, 202 and 203 are carried out during the designing of the dynamic power meter circuit and the design of the integrated circuit 2 of FIG. 1.

Each of these groups of clock signals is then summed by a corresponding one of the clock sum adders at the upper left of FIG. 7, thereby generating (step 204) a set of nine clock sum values. Each clock sum value is then weighted by multiplying it by a corresponding one of nine weighting values, thereby generating a set of nine weighted clock sum values. In one example, the weighting values applied to a clock sum value is roughly proportional to the number of loads that the clock signals of the group are driving. Next, a selected number of the weighted clock sum values are summed (step 206) by the digital summer 55 of FIG. 7. Which ones of the nine weighted clock sum values it is that are summed, and how the summing occurs, is programmable and is controlled and determined by the control value TCS. Next, an average of the sum of the weighted clock sum values coming out of the digital summer 55 of FIG. 7 is generated (step 207). In one example, an average of each respective thirty-two sum values are averaged, thereby generating an average value. Each such average value is called a "clock sum model sub-value". Because one such average is output by the averaging circuit 57 for each thirty-two sum values output from the digital summer 56, it is recognized that there is a stream of "clock sum model sub-values" output from the averaging circuit 57.

At the same time that the stream of "clock sum model sub-values" is being output by the averaging circuit 57 of FIG. 7, a stream of "architectural event model sub-values" is being output by the averaging circuit 63 of FIG. 7. During the design of the integrated circuit 2, a set of architectural event signals is selected (step 208) that represents dynamic power in a time-average manner based on an understanding of the design of the circuit being monitored. These selected event signals are supplied to the dynamic power meter circuit 4 at the lower left of the diagram of FIG. 7. Each event signal is multiplied by a corresponding weighting value. In the diagram of FIG. 7, the weighing values are denoted WES1 through WESN. Each weighting value is determined by a linear regression process. The resulting weighted event signal values are then summed (step 210), thereby generating a weighted event signal sum value. Which of the weighted event signals it is that are summed, and now they are summed, is programmable and is determined by the control value TES. An average of each successive thirty-two sum values is then generated (step 211). In the example of FIG. 7, each of these average values is called an "architectural event model sub-value". There is a stream of these architectural event model sub-values being output by the averaging circuit 63.

Each successive pair of "clock sum model sub-value" and "architectural event model sub-value" is then ratiometrically combined (step 212), thereby generating a linear sum value. In the diagram of FIG. 7, reference identifier 66 identifies one such linear sum value. An offset value is then added (step 213) to each linear sum value, thereby generating a dynamic power meter output value. Accordingly, a stream of dynamic power meter output values is generated and is output from the dynamic power meter circuit 4. In the example of FIG. 7, the stream of dynamic power meter output values is output via conductors 123.

As explained above in connection with FIG. 1, these dynamic power meter output values can be used in various ways on the integrated circuit 2. For example, the processor 5 can be interrupted upon the occurrence of a particular condition involving a dynamic power meter output value. For example, a power management circuit can use dynamic power meter output values to make a determination to send a control signal to an off-chip power supply circuit. For example, a PLL control signal can be sent to a PLL circuit to change an operation of the PLL circuit if the dynamic power meter output values indicate that a particular condition has occurred. The dynamic power meter output values are general purpose values that are usable by a variety of circuits and processes on the integrated circuit 2 to make many different kinds of determinations. The examples set forth here involving a power management circuit, a PLL, and an interrupt signal are just illustrative examples.

Figure 15:
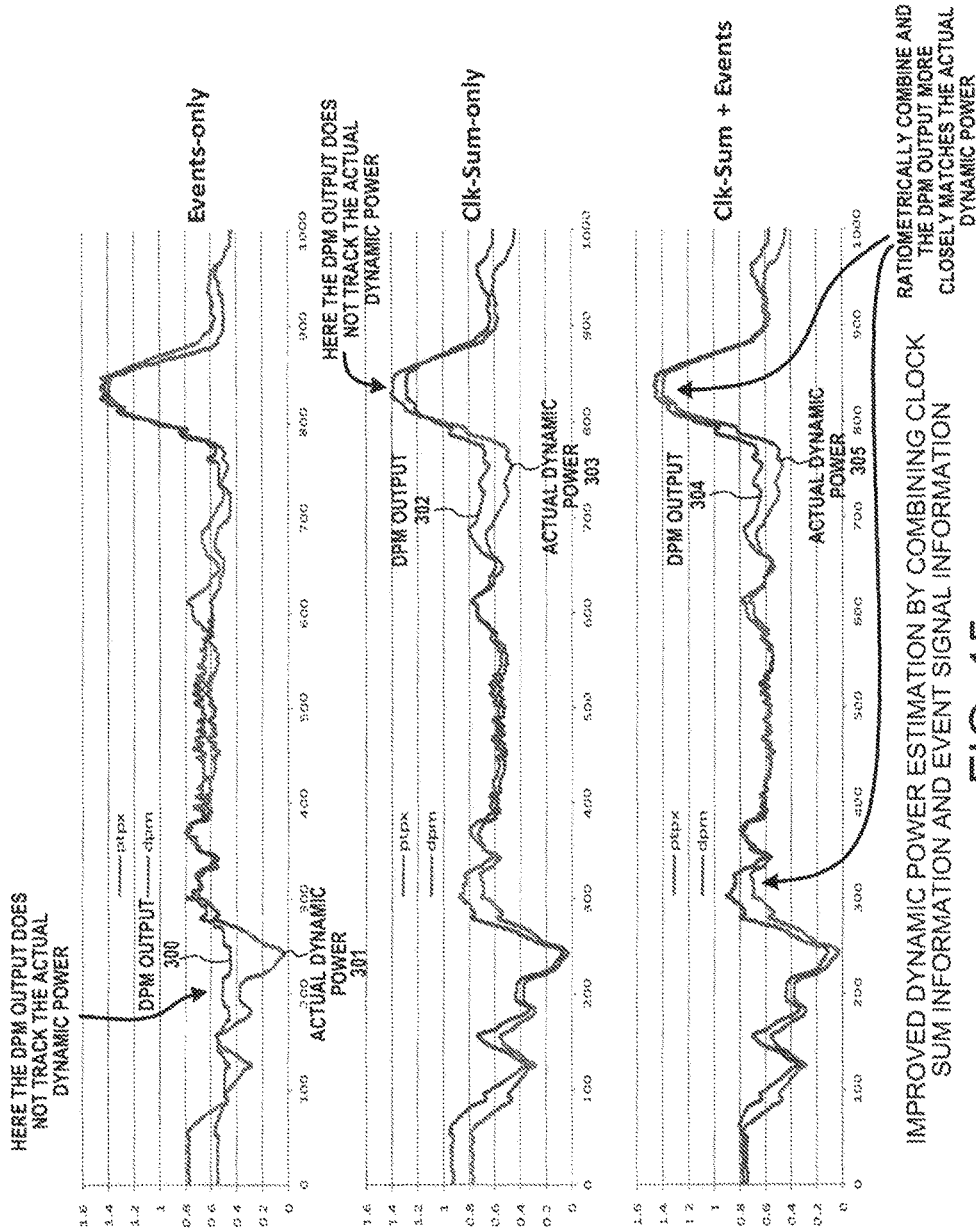
FIG. 15 is a set of waveforms that illustrates how the dynamic power meter circuit 4 of FIG. 7 that ratiometrically combines clock sum data and event signal data has superior performance in tracking actual dynamic power consumption as compared to a dynamic power meter circuit that uses only event signal data.

FIG. 15 is a diagram that illustrates an advantage of the novel specific dynamic power meter circuit 4 of FIG. 7. In the upper waveform diagram of FIG. 15, the DPM output waveform 300 represents dynamic power meter output values as output from the dynamic power meter circuit of FIG. 7, but with the weighting values set so that the clock sums are ignored and only event signal data is considered in determining the dynamic power meter output values. The waveform 301 labeled "actual dynamic power" is considered to be the true dynamic power consumption of the circuit being monitored. Note that early in the waveforms at around the time of cycle 250, that the dynamic power as indicated by the dynamic power meter does not track actual dynamic power very well but that at around the time of cycle 850 the dynamic power as indicated by the dynamic power meter does track the actual dynamic power quite well.

In the middle waveform diagram of FIG. 15, the DPM output waveform 302 represents dynamic power meter output values as output from the dynamic power meter circuit of FIG. 7, but with the weighting values set so that the event signals are ignored and only clock signal sum data is considered in determining the dynamic power meter output values. The waveform 303 labeled "actual dynamic power" is considered to be the true dynamic power consumption of the circuit being monitored. Note that early in the waveforms around cycle 250 that the dynamic power as indicated by the dynamic power meter does track the actual dynamic power quite well, but later in the waveforms at around the time of cycle 850 the dynamic power as indicated by the dynamic power meter does not track actual dynamic power very well.

In the lower waveform diagram of FIG. 15, the DPM output waveform 304 represents dynamic power meter output values as output from the dynamic power meter circuit 4 of FIG. 7, where the weighting values are set so that both the event signals and the clock signals are used in determining the dynamic power meter output values. The waveform 305 labeled "actual dynamic power" is considered to be the true dynamic power consumption of the circuit being monitored. Note that waveform 304 more closely matches the actual dynamic power at around cycle 250 as compared to the waveform 300 in the upper waveform, and also note that waveform 304 more closely matches the actual dynamic power at around cycle 850 as compared to the waveform 302 in the middle waveform. Accordingly, in this example, the ratiometric combination of the "architectural event signal model sub-values" and the "clock sum model sub-values" as carried out by the circuit of FIG. 7 is considered superior to a conventional circuit that only takes event signal data into account.

It should be noted that the dynamic power meter output value that is based on the clock sum model sub-value tracks actual dynamic power consumption in base-clock-cycle resolution. This is because the clock sum circuits of FIGS. 9 and 10 update the sum value every base-clock-cycle.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:
   (a) receiving a plurality of clock signals, wherein each of the clock signals is a single-bit signal that has a minimum interval of change that is approximately half a period TCLK of a processor base clock signal, wherein the processor base clock signal clocks a processor, and wherein the processor is a part of an integrated circuit;
   (b) generating a clock sum value from the plurality of clock signals;
   (c) weighting the clock sum value thereby generating a weighted clock sum value;
   (d) generating a clock sum model sub-value based at least in part on the weighted clock sum value generated in (c);
   (e) receiving a plurality of event signals, wherein each event signal has an event signal value, wherein each event signal has a minimum interval of change that is greater than TCLK/2, wherein each event signal value is a multi-bit digital value, and wherein each event signal value is a software-accessible value that can be read by the processor;
   (f) weighting each of the event signal values thereby generating a corresponding plurality of weighted event signal values;
   (g) summing the weighted event signal values generated in (f) thereby generating a weighted event signal sum value;
   (h) generating an event model sub-value based at least in part on the weighted event signal sum value generated in (g); and
   (i) ratiometrically combining the clock sum model sub-value generated in (d) and the event model sub-value generated in (h) and thereby generating a dynamic power meter output value, wherein (a) through (i) are performed by a dynamic power meter circuit that is part of the integrated circuit.

2. The method of claim 1, wherein the ratiometric combining and generating of (i) involves:
   (i1) ratiometrically combining the clock sum model sub-value generated (d) and the event model sub-value generated in (h) thereby generating a ratiometric sum value; and
   (i2) adding an offset value to the ratiometric sum value thereby generating the dynamic power meter output value.

3. The method of claim 1, wherein at least some of the clock signals received in (a) are gated versions of the processor base clock signal.

4. The method of claim 1, wherein each clock signal of a majority of the clock signals received in (a) has a fanout of greater than ten.

5. The method of claim 1, wherein each clock signal of a majority of the clock signals received in (a) directly drives more than ten sequential logic elements.

6. The method of claim 1, wherein none of the clock signals received in (a) is a software-accessible signal.

7. The method of claim 1, wherein the clock sum model sub-value generated in (d) is an average of a plurality of weighted clock sum values.

8. The method of claim 1, further comprising:
   (a2) receiving a second plurality of clock signals;
   (b2) generating a second clock sum value from the second plurality of clock signals; and
   (c2) weighting the second clock sum value thereby generating a second weighted clock sum value, wherein the clock sum model sub-value generated in (d) is based at least in part on the second weighted clock sum value.

9. The method of claim 8, wherein the clock sum model sub-value generated in (d) is a sum of a plurality of weighted clock sum values including the weighted clock sum value generated in (c) and including the weighted clock sum value generated in (c2).

10. The method of claim 8, wherein the weighted clock sum value generated in (c) and the second weighted clock sum value generated in (c2) can be summed in one of a plurality of ways in the generation of the clock sum model sub-value in (d), the method further comprising:
    (m) storing a type-of-sum-selection value on the integrated circuit, wherein the type-of-sum-selection value determines one way that the weighted clock sum value generated in (c) and the second weighted clock sum value generated in (c2) are summed in the generation of the clock sum model sub-value in (d).

11. The method of claim 1, wherein the event model sub-value generated in (h) is an average of a plurality of weighted event signal sum values.

12. The method of claim 1, further comprising:
    (j) storing a clock sum weighting value on the integrated circuit, wherein the clock sum weighting value is used in (c) to generate the weighted clock sum value;
    (k) storing a first event weighting value on the integrated circuit, wherein the first event weighting value is used in (f) to generate a first of the plurality of weighted event signal values; and
    (l) storing a second event weighting value on the integrated circuit, wherein the second event weighting value is used in (f) to generate a second of the plurality of weighted event signal values.

13. The method of claim 12, further comprising:
    (m) storing a ratiometric value K on the integrated circuit, wherein the ratiometric value K is used in the ratiometric combining of (i).

14. The method of claim 1, further comprising:
    (j) storing ratiometric combining control information on the integrated circuit, wherein the ratiometric combining control information determines how the clock sum model sub-value generated in (d) and the event model sub-value generated in (h) are ratiometrically combined in (i).

15. The method of claim 1, wherein the clock sum value is generated in (b) by a registered adder circuit, and wherein the clock signals are received in (a) onto the registered adder circuit.

16. A method comprising:
    (a) receiving a plurality of clock signals, wherein each of the clock signals is a single-bit signal that is not software-accessible and cannot be read by a processor of an integrated circuit, wherein the processor is clocked by a processor base clock signal CLK, wherein each of the clock signals received in (a) has a minimum interval of change that is not greater than twice a period TCLK of the processor base clock signal CLK;

(b) generating a clock sum value from the plurality of clock signals;
(c) generating a clock sum model sub-value based at least in part on the clock sum value generated in (b);
(d) receiving an event signal, wherein the event signal is a multi-bit software-accessible signal a value of which can be read by the processor;
(e) generating an event model sub-value based at least in part on the event signal received in (d); and
(f) ratiometrically combining the clock sum model sub-value generated in (c) and the event model sub-value generated in (e) and thereby generating a dynamic power meter output value, wherein (a) through (f) are performed by a dynamic power meter circuit that is part of the integrated circuit.

17. The method of claim 16, wherein the processor is clocked by a processor base clock signal CLK, and wherein each of the clock signals received in (a) has a minimum interval of change that is approximately equal to half of a period TCLK of the processor base clock signal CLK.

18. The method of claim 16, wherein the processor is clocked by a processor base clock signal CLK, and wherein some of the clock signals received in (a) are buffered versions of the processor base clock signal, and wherein some of the clock signals received in (a) are gated versions of the processor base clock signal.

* * * * *